(12) United States Patent
Ito et al.

(10) Patent No.: US 6,311,118 B1
(45) Date of Patent: Oct. 30, 2001

(54) VEHICLE SPEED CONTROL SYSTEM

(75) Inventors: Akira Ito; Hideaki Kotani; Hiroshi Sato; Naoto Sen, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,336

(22) Filed: May 12, 2000

(30) Foreign Application Priority Data

May 14, 1999 (JP) .................................................. 11-133776

(51) Int. Cl.[7] ............................ B60K 31/04; F16H 61/38
(52) U.S. Cl. .................. 701/95; 701/55; 477/42; 477/97
(58) Field of Search .................................. 701/54, 55, 56, 701/65, 93, 95; 180/170, 178, 179; 123/403, 349, 350; 477/42, 121, 97, 43, 48

(56) References Cited

U.S. PATENT DOCUMENTS

| | | | |
|---|---|---|---|
| 4,933,859 | * | 6/1990 | Tsuyama et al. ............... 364/426.04 |
| 4,936,403 | * | 6/1990 | Morimoto ........................... 180/176 |
| 4,967,357 | * | 10/1990 | Mimura et al. ................. 364/426.04 |
| 5,317,937 | * | 6/1994 | Yoshizawa et al. ................ 477/120 |
| 5,611,748 | * | 3/1997 | Kashiwabara ........................ 477/47 |
| 6,066,070 | * | 5/2000 | Ito et al. .............................. 477/43 |

FOREIGN PATENT DOCUMENTS

| | | |
|---|---|---|
| 5-71625 | 3/1993 | (JP) . |
| 9-207616 | 8/1997 | (JP) . |
| 10-29448 | 2/1998 | (JP) . |

\* cited by examiner

Primary Examiner—Michael J. Zanelli
(74) Attorney, Agent, or Firm—Arent Fox Kintner Plotkin & Kahn, PLLC (57) ABSTRACT

A system for controlling a speed of a vehicle having a continuously variable transmission (CVT) and a cruise controller which controls the traveling speed of the vehicle to a desired speed in response to the instruction to cruise control inputted by the vehicle operator. In the system, the detected throttle opening is smoothed or filtered such that the speed ratio of the continuously variable transmission is controlled based on the smoothed throttle opening and the detected vehicle speed when the instruction to cruise control is input. Alternatively, a parameter indicative of upslope of the road where the vehicle climbs is determined and the speed ratio is controlled based on the parameter and the detected vehicle speed. With this, the system can reduce the engine speed fluctuation and can prevent the vehicle operator from feeling uneasy when the cruise control is effected.

16 Claims, 9 Drawing Sheets

VEHICLE SPEED CONTROL SYSTEM

BACKGROUND OF THE INVENTION

1. Field of the Invention

This invention relates to a vehicle speed control system, more particularly to a vehicle speed control system equipped with a cruise controller and a CVT (Continuously Variable Transmission).

2. Description of the Related Art

Japanese Laid-open Patent Application No. Hei 10 (1998)-29448 teaches a cruise controller for a vehicle equipped with a CVT. This cruise controller has a followup operation to follow up another vehicle running ahead of the subject vehicle. In this prior art system, when the followup operation is in progress, the ratio (speed ratio) of the CVT is controlled at a fixed ratio and it is determined whether required torque is available. If the required torque is not available, the air/fuel ratio to be supplied to the engine is enriched, thereby reducing the engine speed fluctuation and preventing wandering of the engine speed from happening.

Vehicles equipped with a CVT can act quickly in response to the change of throttle opening operated by the vehicle operator, thereby enhancing the acceleration performance. However, this is disadvantageous when the vehicle conducts cruise control which requires no rapid acceleration. Specifically, when the vehicle under cruise control travels on a road whose grade varies, if the throttle actuator operates to open the throttle valve temporarily so as to maintain a desired vehicle speed, the CVT controller responds too quickly, thereby resulting in the engine speed changing and sometimes making the vehicle operator feel uneasy.

Figure 9:
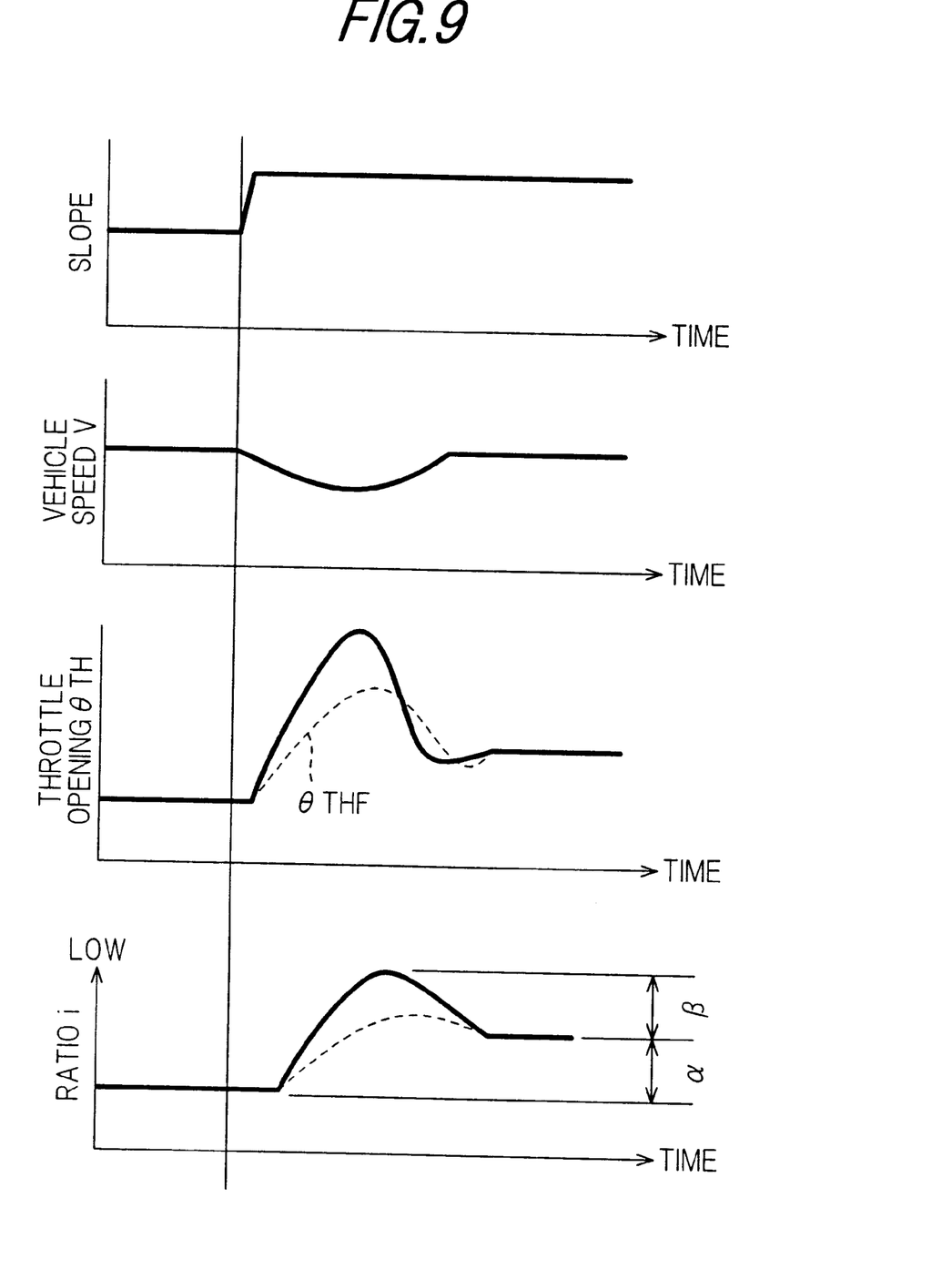
FIG. 9 is a time chart showing the operation of a prior art system in contrast with that of the system according to the invention.

This will be explained with reference to FIG. 9. Assume that the gradient of the road (on which the vehicle climbs) changes as illustrated in the figure by solid line. As the vehicle advances the upsloping road, the vehicle speed drops and as a result, the cruise controller operates the throttle actuator to open the throttle valve so as to raise the vehicle speed toward a desired speed. Parallel to this, the CVT controller controls the ratio (speed ratio) of the CVT to the low side.

As the vehicle speed approaches the desired speed, the cruise controller returns the throttle valve to the closing direction and in response thereto, the CVT controller controls the ratio in the high side to a value, which deviates in the low side by an amount α, for example. However, the CVT controller responds to the throttle actuator operation to open the throttle valve so as to correct the vehicle speed drop, it will further control the ratio to the low side by an additional amount β, for example. In the upslope change illustrated, it suffices if the ratio is controlled only by the amount α. The unnecessary amount β will raise the engine speed, making the vehicle operator feel uneasy.

Although the earlier prior art mentioned above teaches cruise controller for vehicles equipped with a CVT, it does not go beyond simple measures such as fixing the speed ratio when the followup operation is in progress and is therefore incapable of offering a solution to the issues discussed above.

SUMMARY OF THE INVENTION

An object of this invention is to eliminate the drawbacks of the prior art by providing a vehicle speed control system that, when applied to a vehicle equipped with a CVT connected to the vehicle engine for transmitting the engine output torque while continuously varying the speed ratio of the CVT, can reduce the engine speed fluctuation when cruise control is effected so as to control the vehicle speed toward a desired speed in response to the instruction to cruise control inputted by the vehicle operator, thereby preventing the vehicle operator to feel uneasy.

For realizing this object, the present invention provides a system for controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising: operating condition detecting means for detecting operating conditions of the engine and the vehicle including at least an opening of a throttle valve and the speed of the vehicle; throttle opening smoothing means for smoothing the detected opening of the throttle valve; and shift controlling means for controlling a speed ratio of the continuously variable transmission based at least on the detected opening of the throttle valve and the detected speed of the vehicle; wherein the shift controlling means controlling the speed ratio of the continuously variable transmission based at least on the smoothed opening of the throttle valve and the detected speed of the vehicle, when the instruction to cruise control is inputted.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

An embodiment of this invention will now be explained with reference to the attached drawings.

Figure 1:
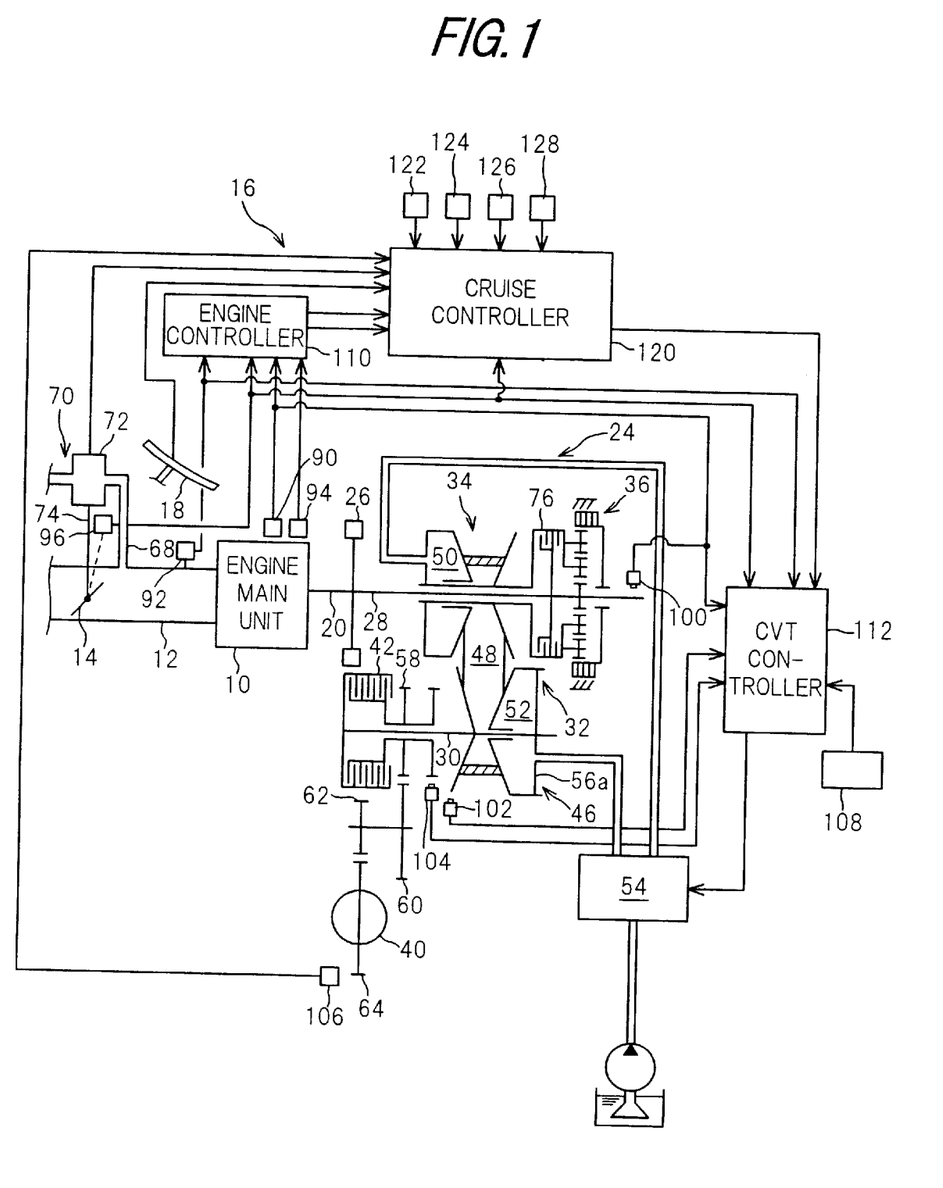
FIG. 1 is an overall schematic view showing an overall configuration of a vehicle speed control system according to the embodiment of the invention.

FIG. 1 is a schematic diagram illustrating the overall configuration of a vehicle speed control system according to this invention.

Reference numeral 10 in the drawing designates an internal combustion engine (hereinafter simply referred to as "engine") 10, more precisely the main unit of the engine 10. A throttle valve 14 is installed in an air intake pipe 12 of the engine 10. The throttle valve 14 is connected through a link mechanism (not shown) to an accelerator pedal 18 located on the floor of a vehicle 16 (partially represented by the engine 10 etc.) near the vehicle operator's seat (not shown). The throttle valve 14 opens and closes in response to manipulation of the accelerator pedal 18 by the vehicle operator.

The output shaft (crankshaft) 20 of the engine 10 is connected to a belt-type continuously variable transmission (hereinafter referred to as "CVT") 24. Specifically, the output shaft 20 of the engine 10 is connected through a dual-mass flywheel 26 to an input shaft 28 of the CVT 24.

The CVT 24 comprises a metal V-belt mechanism 32 located between the input shaft 28 and a counter shaft 30, a planetary gear-type forward/reverse switching mechanism 36 located between the input shaft 28 and a drive-side movable pulley 34, and a starter clutch 42 located between the counter shaft 30 and a differential 40. Power transmitted to the differential 40 is distributed to left and right driven wheels (not shown) through a drive shaft (not shown).

The metal V-belt mechanism 32 comprises the drive-side movable pulley 34 mounted on the input shaft 28, a driven-side movable pulley 46 mounted on the counter shaft 30, and a metal V-belt 48 wound about the two pulleys 34, 46.

The CVT 24 is equipped with a group of regulator valves (not shown) for determining pulley control oil pressure supplied to a drive-side cylinder chamber 50 and a driven-side cylinder chamber 52 of the metal V-belt mechanism 32, and with a group of speed-ratio control valves 54 for supplying the pulley control oil pressure to the cylinder chambers 50 and 52. These set appropriate lateral pulley pressures at which no V-belt 48 slip occurs and vary the pulley width of the pulleys 34, 46 to vary the radius of the V-belt 48 wound about the pulleys 34, 46, thereby continuously varying the speed ratio (named "ratio i").

The starter clutch 42 is for ON/OFF (engage/disengage) connection between the counter shaft 30 and the differential 40. When the starter clutch 42 is ON (engaged), the engine output torque, varied by the metal V-belt mechanism 32, is transmitted through gears 58, 60, 62 and 64 to the differential 40, which divides and transmits it to the left and right drive wheels (not shown). When the starter clutch 42 is OFF (disengaged), the CVT 24 assumes a neutral state.

A branch pipe 68 is connected to the air intake pipe 12 downstream of the throttle valve 14 and the other end of the branch pipe 68 is connected to a throttle actuator 70. The throttle actuator 70 is equipped with a vacuum valve (electromagnetic solenoid valve) 72 for opening and closing the branch pipe 68, and a diaphragm (not shown) for defining a negative pressure chamber connected with the branch pipe 68. The degree of opening of the branch pipe 68 is varied through the operation of the vacuum valve 72 so as to increase or decrease the negative (suction) pressure in the negative pressure chamber and thus vary the position of the diaphragm. The diaphragm is connected to a link 74, whose other end is connected to the throttle valve 14.

The opening of the throttle valve 14 can therefore be controlled by operating the vacuum valve 72. The throttle actuator 70 is thus constituted as a negative-pressure type actuator. Since the details of this arrangement are set out in Japanese Laid-open Patent Application No. Hei 9 (1997)-207616, the explanation here will be limited to the foregoing.

It should be noted that, when the vehicle operator operates the accelerator pedal 18 while the throttle valve 14 is being moved by the throttle actuator 70, the vehicle operator's operation takes precedence in such a way that the throttle valve 14 is opened or closed in response to the desire of the vehicle operator, overcoming the driving force of the throttle actuator 70. When no instruction to cruise control has been input, the throttle actuator 70 is placed at a non-energized location (initial position) corresponding to the fully-closed position of the throttle valve 14.

Although not shown in the drawing, the system according to this embodiment is provided with a radar unit. The radar unit monitors the distance to another vehicle running ahead, and enables to conduct a followup operation, if desired, to followup another vehicle with a prescribed inter-vehicle distance from the subject vehicle 16, parallel to the operation of cruise control.

A crank angle sensor 90 is provided at an appropriate location in the engine 10, such as near the camshaft (not shown) and generates a signal proportional to the piston crank angular positions (one of which is counted and used to determine the engine speed NE). A manifold absolute pressure sensor 92 is installed in the air intake pipe 12 at an appropriate location downstream of the throttle valve 14 and generates a signal proportional to the manifold absolute pressure PBA (the engine load).

A coolant temperature sensor 94 is provided at an appropriate location at the cylinder block (not shown) and generates a signal proportional to the engine coolant temperature TW. A throttle position sensor 96 is installed in the vicinity of the throttle valve 14 and generates a signal proportional to the throttle opening or position $\theta$TH.

In the CVT 24, a first speed sensor 100 is provided near the input shaft 28 and generates a signal proportional to the rotational speed NDR of the input shaft 28. A second speed sensor 102 is provided near the driven-side movable pulley 46 and generates a signal proportional to the rotational speed of the driven-side movable pulley 46, i.e. the rotational speed NDN of the input shaft (counter shaft 30) of the starter clutch 42. A third speed sensor 104 is provided near the gear 58 and generates a signal proportional to the rotational speed of the gear 58, i.e. the rotational speed NOUT of the output shaft of the starter clutch 42.

A vehicle speed sensor 106 is provided near the drive shaft (not shown) connected to the differential 40 and generates a signal proportional to the vehicle (travelling) speed V. A shift lever position switch 108 is provided in the vicinity of the shift lever (not shown) installed on the vehicle floor near the vehicle operator's seat and generates a signal proportional to the range position (D, N, P . . . ) selected by the vehicle operator.

The system is equipped with an engine controller 110 comprising a microcomputer and a CVT controller 112 also comprising a microcomputer. The outputs of the crank angle sensor 90, the manifold absolute pressure sensor 92, the coolant temperature sensor 94 and the throttle position sensor 96 are input to the engine controller 110. The engine controller 110 controls the operation of the engine 10 based on the input values.

The outputs of the throttle position sensor 96, vehicle speed sensor 106, first to third speed sensors 100, 102 and 104, and the shift lever position switch 108 are input to the CVT controller 112. The CVT controller 112 controls the ratio i through the aforesaid groups of valves based on the input values.

Specifically, the CVT controller 112 determines a desired engine speed NED by retrieving a shift scheduling map (explained later) using the vehicle speed V and the throttle opening θTH as address data. It then determines a desired value of NDR (desired NDR) for achieving the determined (retrieved) desired engine speed NED and operates the movable pulleys 34, 46 through the valve groups such that the determined desired NDR is achieved. Since NDR is the rotational speed of the drive-side movable pulley 34 of the CVT 24, ratio i can solely be determined by defining the desired value (desired NDR) relative to the vehicle speed V.

The system is also provided with a cruise controller 120 also comprising a microcomputer. The outputs of the throttle position sensor 96 and the vehicle speed sensor 106 are input to the cruise controller 120.

In the vicinity of the steering wheel (not shown) installed near the operator's seat of the vehicle 16 are provided a set switch 122 which generates an ON signal, when manipulated by the vehicle operator, indicative of his or her desire to implement cruise control (instruction to cruise control) and to set (input) the vehicle speed (desired vehicle speed), a resume switch 124 which generates an ON signal, when manipulated by the vehicle operator, indicative of his or her desire to resume cruise control after the instruction to cruise control has been interrupted or canceled by braking or the like, and a cancel switch 126 which generates an ON signal, when manipulated by the vehicle operator, indicative of his or her desire to cancel the instruction to cruise control.

A brake switch 128 is installed in the vicinity of the brake pedal (not shown) and generates an ON signal when the vehicle operator depresses the brake pedal for braking.

The outputs of the foregoing switches 122 to 128 are input to the cruise controller 120. Based on the outputs of these switches, the cruise controller 120 recognizes the instruction to cruise control and implements cruise control via the throttle actuator 70 as explained later. Further, if required, it conducts the followup operation.

The operation of the vehicle speed control system according to the embodiment will now be explained.

Figure 2:
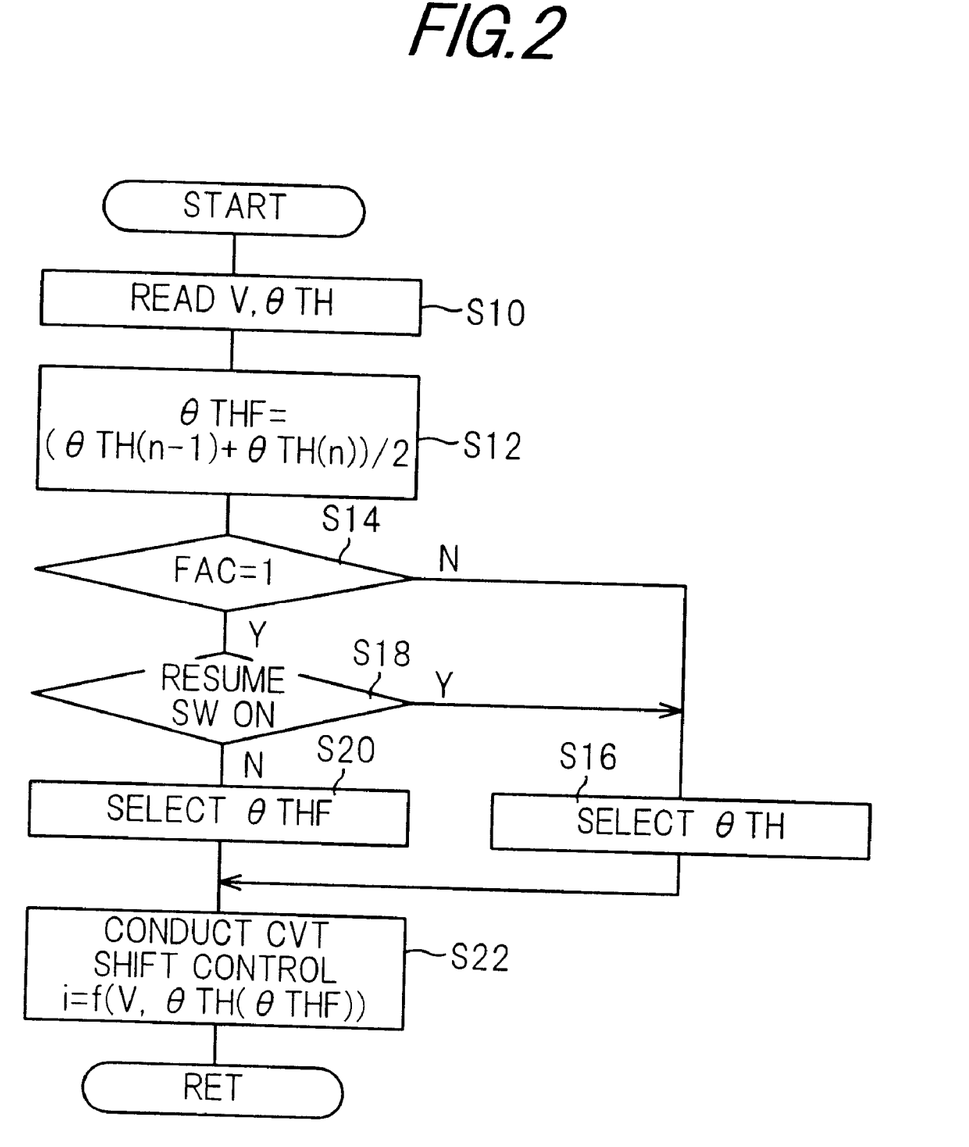
FIG. 2 is a flow chart showing the operation of the system, more particularly the operation conducted by a CVT controller in the system illustrated in FIG. 1.

FIG. 2 is a flow chart showing the operation of the system. The illustrated program is executed by the CVT controller 112 at prescribed time intervals of, for instance, 20 msec.

The program begins in S10 in which the detected vehicle speed V and throttle opening θTH are read and proceeds to S12 in which the filtering or smoothing of the throttle opening θTH is conducted. This is done by, as illustrated, calculating a simple average between the values of the throttle opening θTH(n) in current and that θTH(n−1) in the preceding (last) cycle, i.e. the average of the difference between the throttle opening detected in the preceding loop of the flow chart of FIG. 2 and that detected in the current loop. The value (substitutional parameter), thus-filtered or smoothed, is named "θTHF". Here, the weighted average may instead be used. Any other technique may also be used if it can smooth or average the throttle opening.

The program then proceeds to S14 in which it is determined whether the bit of a flag FAC is set to 1. The bit of this flag is set to 1 in a processing conducted by the cruise controller 120 when the vehicle operator inputs the instruction to cruise control. Therefore, the processing of this step amounts to a discrimination as to whether the instruction to cruise control has been input.

Figure 3:
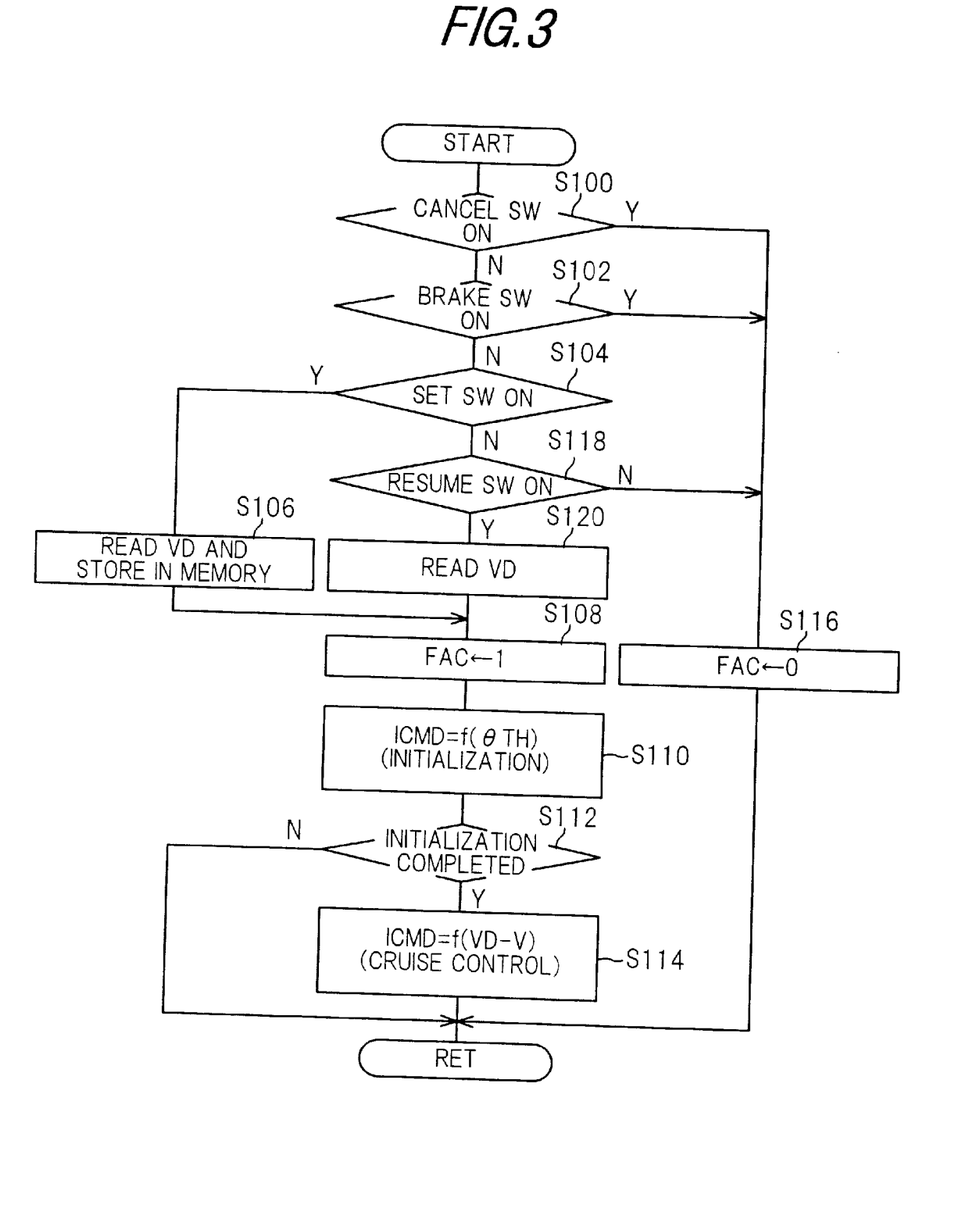
FIG. 3 is a flow chart showing the operation of the system, more particularly the operation conducted by a cruise controller in the system illustrated in FIG. 1.

This processing conducted by the cruise controller 120 will now be explained.

FIG. 3 is a flow chart showing this processing. The illustrated program is executed once every 200 msec, for example.

The program begins in S100 in which it is determined whether the cancel switch 126 generates the ON signal, i.e. whether the vehicle operator has canceled the instruction to cruise control. When the result is NO, the program proceeds to S102 in which it is determined whether the brake switch 128 generates the ON signal, i.e. whether braking is being conducted.

When the result in S102 is NO, the program proceeds to S104 in which it determined whether the set switch 122 is ON, i.e. whether the vehicle operator has inputted the intention to cruise and a set vehicle speed.

When the result in S104 is YES, the program proceeds to S106 in which the set vehicle speed (desired vehicle speed VD) inputted through the set switch 122 is read and stored in memory, and to S108 in which the bit of the flag FAC is set to 1. In other words, it is determined that the vehicle operator has inputted the intention to cruise.

The program then proceeds to S110 in which the initialization (initial operation) is conducted. Specifically, since the throttle actuator 70 is at the non-energized position (position corresponding to the fully-closed throttle position) until the instruction to cruise control is inputted, a current command value ICMD required to drive the throttle actuator 70 (more precisely, the link 74) to the position corresponding to the throttle opening at the time the instruction to cruise control was input is determined or calculated and outputted through a driver (not shown) to the vacuum valve 72 to operate the throttle actuator 70.

The program proceeds to S112 in which it is determined whether the initialization has been completed, i.e. whether driving of the throttle actuator 70 to the position corresponding to the throttle opening at the time the cruise command was inputted has been completed.

When the result in S112 is NO, the remaining processing steps are skipped. When it is YES, the program proceeds to S114 in which the current command value ICMD to be supplied to the vacuum valve 72 of the throttle actuator 70 is calculated in accordance with the difference between the set vehicle speed (desired vehicle speed VD) and the detected vehicle speed V using a PID control rule or the like. In other words, since the initialization has been completed, the processing shifts to the cruise control, i.e. control for converging the vehicle speed V to the desired vehicle speed VD.

On the other hand, when the result in S100 or S102 is YES, the program proceeds to S116 in which the bit of the flag FAC is reset to 0. When the result in S104 is NO, the program proceeds to S118 in which it is determined whether the resume switch 124 generates the ON signal, i.e. whether the vehicle operator has inputted the instruction to resume cruise control.

When the result in S118 is YES, the program proceeds to S120 in which the set vehicle speed (desired vehicle speed VD) stored in memory is read, and then to S108. When the result is NO, the program proceeds to S116 in which the bit of the flag FAC is reset to 0.

The explanation of FIG. 2 will now be continued.

When the result in S14 is NO, the program proceeds to S16 in which the detected throttle opening θTH is selected. On the other hand, when the result in S14 is YES, the program proceeds to S18 in which it is determined whether the acceleration is needed based on the output of the resume switch 124 or on the throttle opening change. When the result in S18 is YES, the program proceeds to S16 such that the acceleration takes precedence. On the contrary, when the result in S18 is NO, the program proceeds to S20 in which the filtered or smoothed throttle opening θTHF is selected.

The program then proceeds to S22 in which CVT shift control is conducted.

Figure 4:
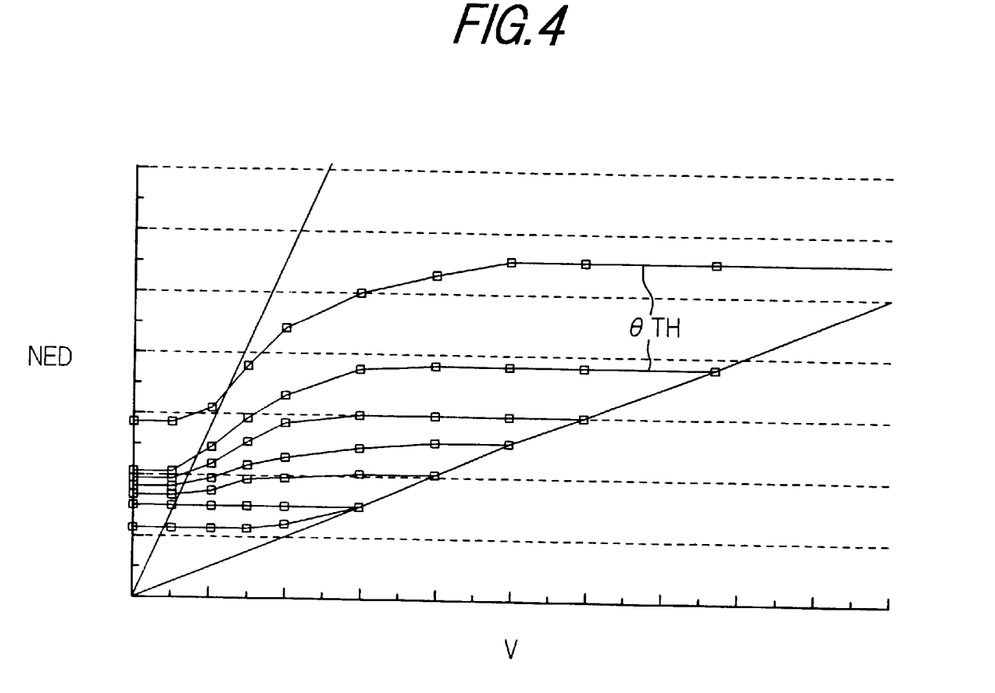
FIG. 4 is a graph showing characteristics of a shift scheduling map referred to in the flow chart of FIG. 2.

The specific operations conducted by the CVT controller 112 are, as mentioned earlier, to determine the ratio i by retrieving it from a shift scheduling map (whose characteristics are shown in FIG. 4) using the detected vehicle speed V and the detected throttle opening θTH (or the filtered throttle opening θTHF) as address data and to control the CVT 24 such that the actual ratio converges to the desired ratio. Still more specifically, the CVT controller 112 determines the desired engine speed NED by retrieval from the map (whose characteristics are shown in FIG. 4) using the detected vehicle speed V and the throttle opening θTH (or θTHF) as address data, determines the desired NDR which can achieve the determined desired engine speed NED, and drives the movable pulleys 34, 46 through the valve group 54 and some similar elements such that the desired NDR is realized.

It may alternatively be possible to use the desired engine speed NED for immediately (directly) driving the movable pulleys 34, 46 in accordance with appropriate characteristics or to use the desired engine speed NED to determined a desired ratio between NDR and NDN and drive the movable pulleys 34, 46 such that this desired ratio is realized. The terms "control of (speed) ratio i" or "CVT shift control" used in this specification are defined to encompass all of these three types of control.

Explaining the operation of the system again referring to FIG. 9, since the filtered or smoothed throttle opening θTHF is used as shown by dashed lines in the figure when no acceleration is needed at the time of effecting the cruise control in response to the vehicle operator, the ratio of the CVT 24 can be controlled to a value, as shown by dashed lines, more higher than the prior art, thereby almost eliminating the unnecessary amount β.

Owing to the aforesaid configuration, the system according to this embodiment can avoid occurrence of the engine speed fluctuation and, as a result, can prevent the vehicle operator to feel uneasy, when the cruise control is effected. Further, since the filtered or smoothed throttle opening θTHF is only used when acceleration is not required, the configuration will not degrade the acceleration performance.

Figure 5:
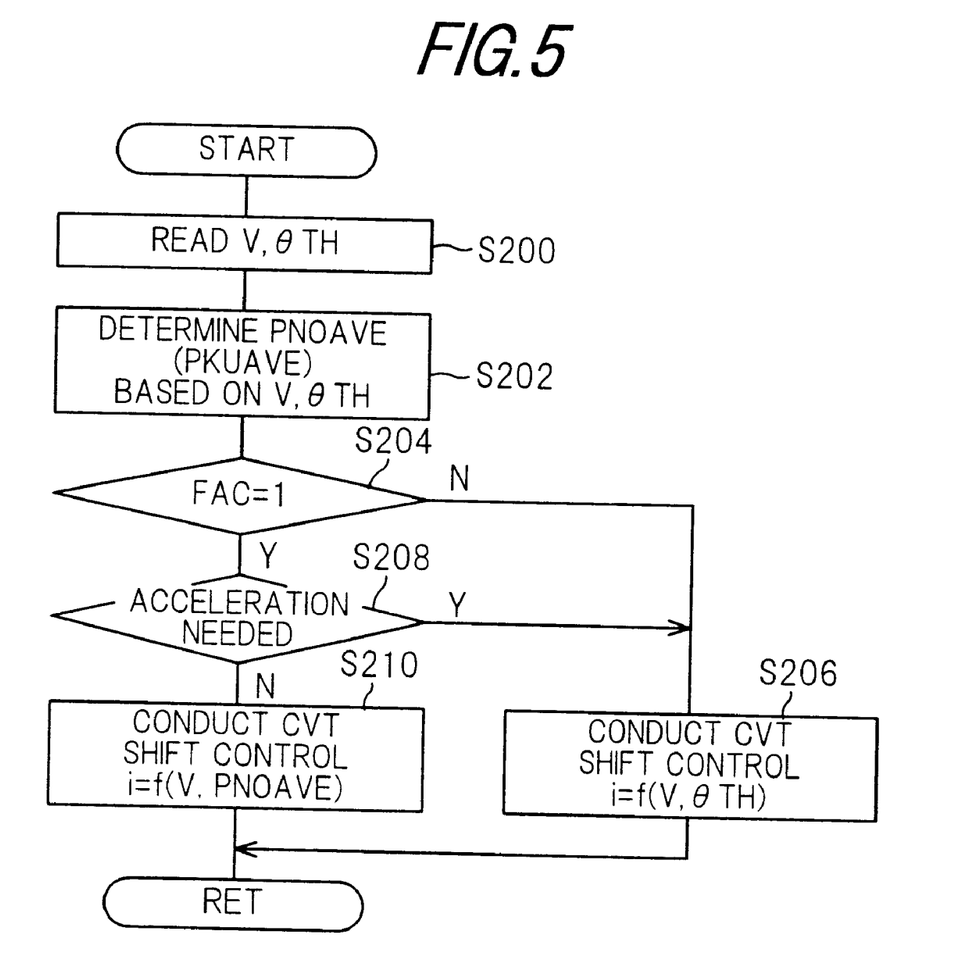
FIG. 5 is a view, similar to FIG. 2, but showing the operation of a vehicle speed control system according to a second embodiment of the invention.

FIG. 5 is a flow chart, similar to that of FIG. 2, but showing the operation of a vehicle speed control system according to a second embodiment of this invention.

The program begins in S200 in which the detected vehicle speed V and real throttle opening θTH are read and proceeds to S202 in which parameters PNOAVE and PKUAVE indicative of the running resistance or load acting on the vehicle 16 are determined or calculated based on the detected vehicle speed V and throttle opening θTH. More specifically, a parameter PNOAVE indicative of vehicle upslope or a parameter PKUAVE indicative of downslope of the road on which the vehicle 16 travels, is determined or calculated.

Figure 6:
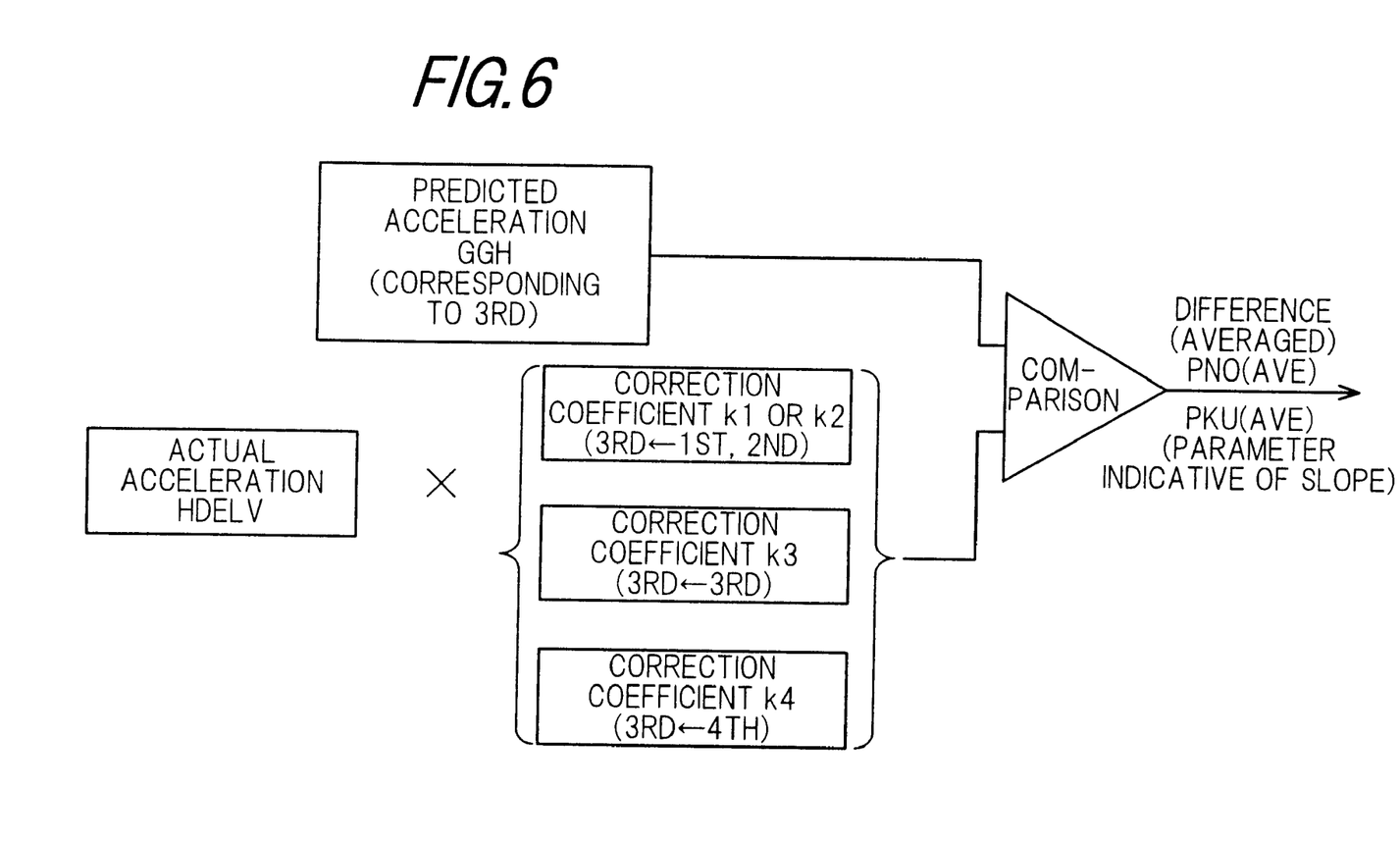
FIG. 6 is a view showing the determination of a running resistance, more specifically a parameter indicative of upslope (or downslope on which the vehicle travels) referred to in the flow chart of FIG. 5.

This determination, which is explained in detail in Japanese Laid-open Patent Application No. Hei 5(1993)-71625 etc. proposed by the assignee, will be briefly explained with reference to FIG. 6.

The predicted acceleration anticipated for the vehicle 16 when traveling on a flat road is determined by retrieving for each of the third gear (speed) from predetermined mapped characteristics using the vehicle speed V and the throttle opening θTH as address data.

On the other hand, the first-order difference of the vehicle speed V is used to determine or calculate the actual acceleration that has actually been produced in the vehicle 16, and a correction coefficient kn is determined by retrieving from predetermined mapped characteristics again using the vehicle speed V and the throttle opening θTH as address data. Then the actual acceleration is multiplied by the correction coefficient kn to be corrected as that corresponding to the third gear.

Next, the difference between the calculated predicted accelerations and the actual acceleration is calculated and averaged. Specifically, when the difference obtained by subtracting the actual acceleration from the predicted acceleration is a positive value, the value is defined as PNO (the average value thereof being PNOAVE, the parameter indicative of upslope of the road on which the vehicle 16 travels). When the difference is negative, it follows that the value obtained by subtracting the predicted acceleration from the actual acceleration will be a positive value and this is defined as PKU (the average value thereof being PKUAVE, the parameter indicative of downslope of the road on which the vehicle 16 travels).

In the technique proposed earlier by the assignee, the parameter PNOAVE or PKUAVE is used to select one from among five shift scheduling maps prepared beforehand for flat-road driving, moderate uphill driving etc. and a gear (speed) is determined by retrieving the selected map with the detected throttle opening θTH and the vehicle speed V. In the system according to this embodiment, the determined parameter PNOAVE or PKUAVE, more specifically PNOAVE, is used as a CVT shift control parameter in place of the throttle opening θTH.

Returning to the explanation of FIG. 5, the program proceeds to S204 in which it is determined whether the bit of the flag FAC is set to 1. When the result in S204 is NO, the program proceeds to S206 in which, as explained with regard to S22 of the first embodiment, the ordinary CVT shift control is conducted wherein the ratio i is determined by map-retrieval using the vehicle speed V and throttle opening θTH as address data.

Figure 7:
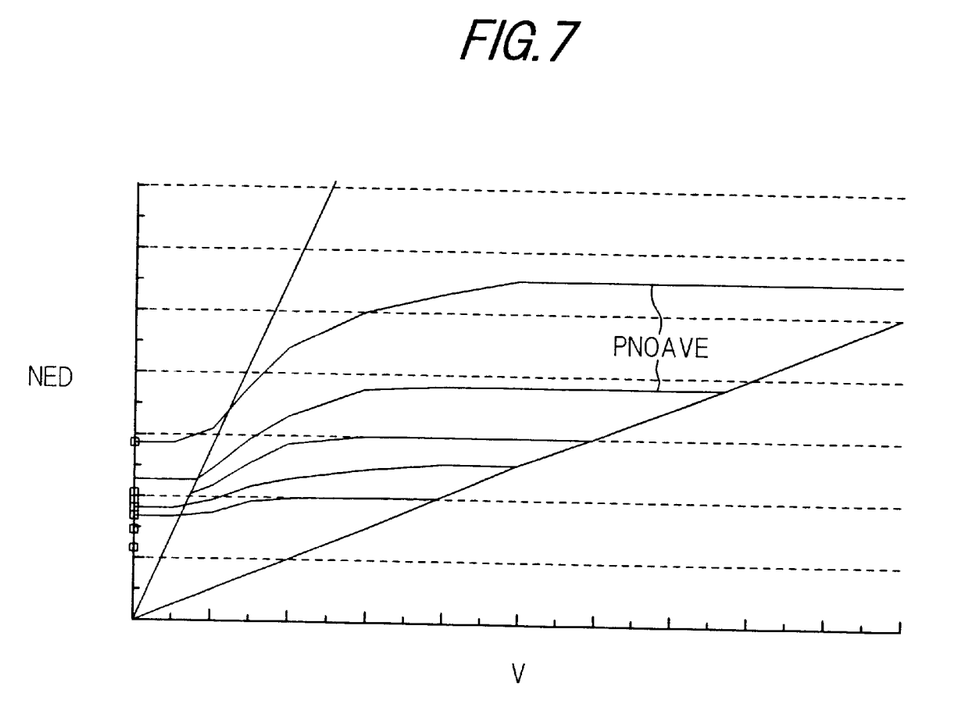
FIG. 7 is a graph showing characteristics of a shift scheduling map referred to in the flow chart of FIG. 5.

On the other hand, when the result in S204 is YES, the program proceeds to S208 in which it is determined whether the acceleration is needed in the same manner as the first embodiment. When the result in S208 is YES, the program proceeds to S206 such that the acceleration takes precedence. On the contrary, when the result in S208 is NO, the program proceeds to S210 in which the ratio (speed ratio) i is determined or calculated by retrieval from a shift scheduling map (whose characteristics are shown in FIG. 7) using the detected vehicle speed V and the upslope parameter PNOAVE (as a substitutional parameter) as address data, and the CVT 24 is controlled to achieve the so-determined ratio i.

Figure 8:
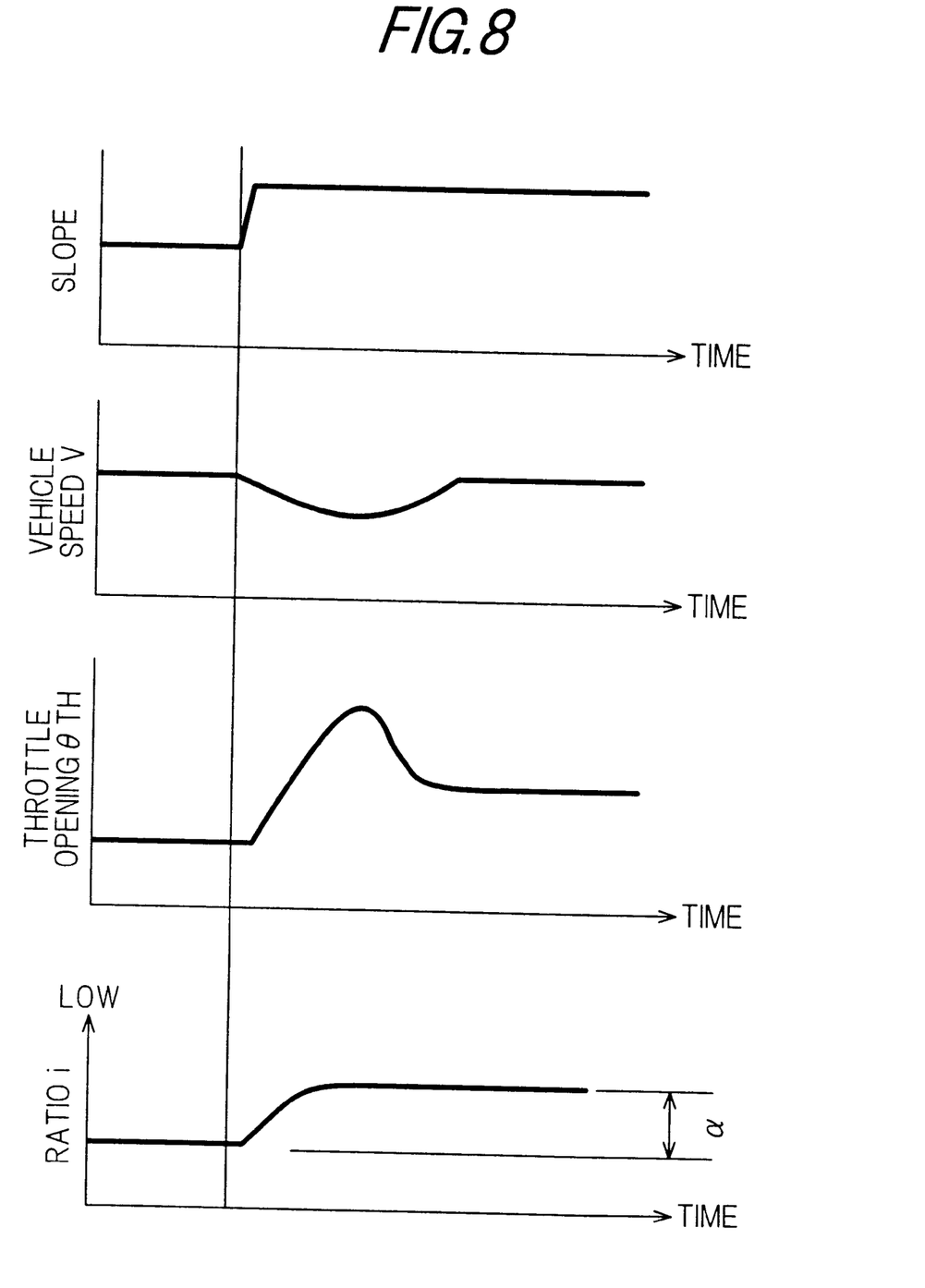
FIG. 8 is a time chart showing the operation of the system illustrated in the flow chart of FIG. 5.

The nature of the control effected by the second embodiment is illustrated in FIG. 8.

As shown, when the vehicle speed V drops in response to the change in the road upslope, although the throttle opening remains unchanged, since the vehicle speed V becomes low, the upslope parameter PNOAVE is determined in the direction in which the road upslope increases. With this, the CVT controller 112 controls the ratio to the low side. As pointed out above, the throttle opening θTH changes meanwhile. Since, however, no throttle opening θTH is used as a shift control parameter, the ratio is changed to the low side only by the amount α. Thus, since the throttle opening θTH is not used as the parameter for the CVT shift control, the shift control is unaffected by any fluctuation that may occur in the throttle opening θTH.

The system according to the second embodiment therefore can avoid occurrence of the inconvenience explained with reference to FIG. 9, can reduce the engine speed fluctuation and, as a result, can prevent the vehicle operator to feel uneasy, when the cruise control is effected. Further, since the upslope parameter PNOAVE is only used when acceleration is not required, the configuration will not degrade the acceleration performance. The rest of the configuration as well as the effects and advantages thereof is the same as the first embodiment.

It should be noted, although the second embodiment utilizes the technique proposed earlier by the assignee of determining the running resistance (specifically a parameter indicative of the upslope of the road on which the vehicle travels) and use the determined value as a CVT shift control parameter, they can instead be equipped with a slope sensor or the like for detecting the slope the of road directly.

It should also be noted that, although the cruise control is disclosed as an example of the vehicle speed control, the followup operation will be added if desired.

It should also be noted that, although a negative-pressure type throttle actuator is used, a motor type or any other Drive-By-Wire type may instead be used.

It should further be noted that, although a metal-belt-type CVT is used, a rubber-belt type or a toroidal-belt type may instead be used.

It should further be noted that, the first to sixth embodiments may be configured not only as a CVT but also so as to select an optimum gear of a multi-step transmission. Replacement of the speed ratio with the slip rate of a torque converter lockup clutch may also possible.

It should further be noted that, the CVT is not limited to the illustrated configuration. A torque converter may be connected to the output shaft of the engine 10 and be used in place of the starter clutch 42. Further, the dual-mass flywheel may be eliminated.

The first and second embodiments are thus configured to have a system for controlling a speed (V) of a vehicle (16) having a continuously variable transmission (CVT 24) which transmits output torque generated by an internal combustion engine (10) mounted on the vehicle to drive wheels of the vehicle, and a cruise controller (120) which controls the speed of the vehicle (V) to a desired speed (VD) in response to an instruction to cruise control inputted by a vehicle operator, including: operating condition detecting means (96, 106, S10, S200) for detecting operating conditions of the engine and the vehicle including at least an opening of a throttle valve (θTH) and the speed of the vehicle (V); and shift controlling means (112, S22, S206) for controlling a speed ratio (i) of the continuously variable transmission based at least on the detected opening of the throttle valve (θTH) and the detected speed of the vehicle (V). The characteristic feature of the system is that the system includes: substitutional parameter determining means (S12, S202) for determining a substitutional parameter (θTHF, PNOAVE) to be used instead of the detected opening of the throttle valve (θTH); and the shift controlling means controls the speed ratio of the continuously variable transmission based at least on the substitutional parameter and the detected speed of the vehicle, when the instruction to cruise control is inputted (S14, S100–S108, S22, S204, S210).

In the system, the substitutional parameter determining means includes; throttle opening smoothing means (S12) for smoothing the detected opening of the throttle valve (θTH); and determines the smoothed opening of the throttle valve (θTHF) as the substitutional parameter. In the system, the throttle opening smoothing means smoothes the detected opening of the throttle valve by calculating an average between the detected openings of the throttle valve (S12).

In the system, the substitutional parameter determining means includes; running resistance determining means (S202) for determining a running resistance (PNOAVE) acting on the vehicle; and determines the running resistance as the substitutional parameter. In the system, the running resistance is determined to be a parameter (PNOAVE) indicative of upslope of a road where the vehicle (16) climbs.

The system further includes: acceleration determining means (S18, S208) for determining whether acceleration is needed; and the shift controlling means controls the speed ratio of the continuously variable transmission based at least on the substitutional parameter and the detected speed of the vehicle, when the acceleration is determined to be not needed (S22, S210).

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising:

operating condition detecting means for detecting operating conditions of the engine and the vehicle including at least an opening of a throttle valve and the speed of the vehicle;

throttle opening smoothing means for smoothing the detected opening of the throttle valve; and shift controlling means for controlling a speed ratio of the continuously variable transmission based at least on the detected opening of the throttle valve and the detected speed of the vehicle;

wherein
      the shift controlling means controlling the speed ratio of the continuously variable transmission based at least on the smoothed opening of the throttle valve and the detected speed of the vehicle, when the instruction to cruise control is inputted.

2. A system according to claim 1, further including:
   acceleration determining means for determining whether acceleration is needed;
   and the shift controlling means controls the speed ratio of the continuously variable transmission based at least on the smoothed opening of the throttle valve and the detected speed of the vehicle, when the acceleration is determined to be not needed.

3. A system according to claim 1, wherein the throttle opening smoothing means smoothes the detected opening of the throttle valve by calculating an average between the detected openings of the throttle valve.

4. A system according to claim 2, wherein the throttle opening smoothing means smoothes the detected opening of the throttle valve by calculating an average between the detected openings of the throttle valve.

5. A system for controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising:

operating condition detecting means for detecting operating conditions of the engine and the vehicle including at least an opening of a throttle valve and the speed of the vehicle;

first shift controlling means for controlling a speed ratio of the continuously variable transmission based at least on the detected opening of the throttle valve and the detected speed of the vehicle;

running resistance determining means for determining a running resistance acting on the vehicle; and second shift controlling means for controlling the speed ratio of the continuously variable transmission based at least on the determined running resistance and the detected speed of the vehicle;

wherein the second shift controlling means controlling the speed ratio of the continuously variable transmission based at least on the determined running resistance and the detected speed of the vehicle, when the instruction to cruise control is inputted.

6. A system according to claim 5, further including:

acceleration determining means for determining whether acceleration is needed;

and the second shift controlling means controlling the speed ratio of the continuously variable transmission based at least on the determined running resistance and the detected speed of the vehicle, when the acceleration is determined to be not needed.

7. A system according to claim 5, wherein the running resistance is determined to be a parameter indicative of upslope of a road where the vehicle climbs.

8. A system according to claim 6, wherein the running resistance is determined to be a parameter indicative of upslope of a road where the vehicle climbs.

9. A method controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising the steps of:

detecting operating conditions of the engine and the vehicle including at least an opening of a throttle valve and the speed of the vehicle;

smoothing the detected opening of the throttle valve; and controlling a speed ratio of the continuously variable transmission based at least on the detected opening of the throttle valve and the detected speed of the vehicle;

wherein the step of shift control controlling the speed ratio of the continuously variable transmission based at least on the smoothed opening of the throttle valve and the detected speed of the vehicle, when the instruction to cruise control is inputted.

10. A method according to claim 9, further including the step of:

determining whether acceleration is needed;

and the step of shift control controlling the speed ratio of the continuously variable transmission based at least on the smoothed opening of the throttle valve and the detected speed of the vehicle, when the acceleration is determined to be not needed.

11. A method according to claim 9, wherein the step of throttle opening smoothing smoothing the detected opening of the throttle valve by calculating an average between the detected openings of the throttle valve.

12. A method according to claim 10, wherein the step of throttle opening smoothing smoothing the detected opening of the throttle valve by calculating an average between the detected openings of the throttle valve.

13. A method of controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising the steps of:

detecting operating conditions of the engine and the vehicle including at least an opening of a throttle valve and the speed of the vehicle;

controlling a first speed ratio of the continuously variable transmission based at least on the detected opening of the throttle valve and the detected speed of the vehicle;

determining a running resistance acting on the vehicle; and controlling a second speed ratio of the continuously variable transmission based at least on the determined running resistance and the detected speed of the vehicle;

wherein the step of shift control controlling the second speed ratio of the continuously variable transmission based at least on the determined running resistance and the detected speed of the vehicle, when the instruction to cruise control is inputted.

14. A method according to claim 13, further including the step of:

determining whether acceleration is needed;

and the step of shift control controlling the second speed ratio of the continuously variable transmission based at least on the determined running resistance and the detected speed of the vehicle, when the acceleration is determined to be not needed.

15. A method according to claim 13, wherein the running resistance is determined to be a parameter indicative of upslope of a road where the vehicle climbs.

16. A method according to claim 14, wherein the running resistance is determined to be a parameter indicative of upslope of a road where the vehicle climbs.

* * * * *